United States Patent
Ho et al.

(10) Patent No.: US 10,535,360 B1
(45) Date of Patent: Jan. 14, 2020

(54) PHONE STAND USING A PLURALITY OF DIRECTIONAL SPEAKERS

(71) Applicant: TP Lab, Inc., Palo Alto, CA (US)

(72) Inventors: Chi Fai Ho, Palo Alto, CA (US); John Chiong, San Jose, CA (US)

(73) Assignee: TP Lab, Inc., Palo Alto, CA (US)

( * ) Notice: Subject to any disclaimer, the term of this patent is extended or adjusted under 35 U.S.C. 154(b) by 205 days.

(21) Appl. No.: 15/605,079

(22) Filed: May 25, 2017

(51) Int. Cl.
| | |
|---|---|
| *G10L 21/02* | (2013.01) |
| *H04R 1/40* | (2006.01) |
| *H04R 1/02* | (2006.01) |
| *G10L 15/22* | (2006.01) |
| *G10L 21/0272* | (2013.01) |
| *G10L 25/84* | (2013.01) |
| *G06F 3/16* | (2006.01) |
| *G10L 21/0208* | (2013.01) |

(52) U.S. Cl.
CPC .......... *G10L 21/0205* (2013.01); *G06F 3/165* (2013.01); *G10L 15/22* (2013.01); *G10L 21/0208* (2013.01); *G10L 21/0272* (2013.01); *G10L 25/84* (2013.01); *H04R 1/028* (2013.01); *H04R 1/403* (2013.01); *G10L 2015/223* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 7,346,315 | B2* | 3/2008 | Zurek | H04M 1/03 381/335 |
| 8,588,432 | B1* | 11/2013 | Simon | H04R 27/00 381/77 |
| 2004/0114770 | A1* | 6/2004 | Pompei | H04R 5/02 381/77 |
| 2004/0209654 | A1* | 10/2004 | Cheung | H04S 1/00 455/567 |
| 2005/0049864 | A1* | 3/2005 | Kaltenmeier | G10L 15/20 704/233 |
| 2005/0267759 | A1* | 12/2005 | Jeschke | B60R 16/0373 704/270 |
| 2006/0208169 | A1* | 9/2006 | Breed | B60N 2/002 250/221 |

(Continued)

*Primary Examiner* — Thuykhanh Le
(74) *Attorney, Agent, or Firm* — North Shore Patents, P.C.; Michele Liu Baillie

(57) ABSTRACT

A phone stand includes a phone holder for coupling to a phone conducting a voice session, a plurality of directional speakers positioned to project sound to a focused audio area corresponding to a location where a user is expected to be positioned, other speaker(s), and a system controller. The system controller is configured to receive audio signals of the voice session from the phone, separate the audio signals into speech signals and non-speech signals, obtain output mixing attributes, generate mixed signals by combining the speech signals and the non-speech signals according to the output mixing attributes, and send the mixed signals to the plurality of directional speakers. The other speaker(s) can include non-directional speakers, and the system controller is further configured to send the speech signals in the mixed signals to the plurality of directional speakers and the non-speech signals in the mixed signals to the other speaker(s).

24 Claims, 10 Drawing Sheets

(56) References Cited

U.S. PATENT DOCUMENTS

| | | | |
|---|---|---|---|
| 2006/0224382 A1* | 10/2006 | Taneda | G10L 15/25 704/233 |
| 2007/0038442 A1* | 2/2007 | Visser | G10L 21/0208 704/233 |
| 2007/0184857 A1* | 8/2007 | Pollock | H04W 4/18 455/466 |
| 2008/0036580 A1* | 2/2008 | Breed | B60R 21/01536 340/438 |
| 2008/0273712 A1* | 11/2008 | Eichfeld | H04S 7/302 381/86 |
| 2009/0055170 A1* | 2/2009 | Nagahama | G10L 15/20 704/226 |
| 2009/0076810 A1* | 3/2009 | Matsuo | H03G 3/32 704/225 |
| 2009/0089054 A1* | 4/2009 | Wang | H04M 9/082 704/233 |
| 2009/0092284 A1* | 4/2009 | Breed | B60J 10/00 382/103 |
| 2011/0103614 A1* | 5/2011 | Cheung | H04R 1/403 381/94.1 |
| 2012/0078609 A1* | 3/2012 | Chaturvedi | G06F 17/289 704/3 |
| 2014/0122090 A1* | 5/2014 | Park | G06F 3/167 704/275 |
| 2014/0135075 A1* | 5/2014 | Kobayashi | H04M 1/03 455/567 |
| 2014/0192204 A1* | 7/2014 | Glazer | H04N 5/23296 348/169 |
| 2014/0372113 A1* | 12/2014 | Burnett | G10L 21/0208 704/233 |
| 2015/0036835 A1* | 2/2015 | Chen | H04R 1/1041 381/74 |
| 2015/0049887 A1* | 2/2015 | Bleacher | G06K 9/00832 381/302 |
| 2015/0189048 A1* | 7/2015 | McLaughlin | H04M 1/2155 455/569.1 |
| 2015/0237446 A1* | 8/2015 | Katayama | H04R 1/323 381/163 |
| 2015/0310874 A1* | 10/2015 | Fromel | G10L 21/0364 704/205 |
| 2015/0356983 A1* | 12/2015 | Tsujikawa | G10L 21/0208 704/226 |
| 2016/0336022 A1* | 11/2016 | Florencio | G10K 11/002 |
| 2017/0048611 A1* | 2/2017 | Wu | H04R 1/345 |
| 2017/0052566 A1* | 2/2017 | Ka | G06F 3/0483 |
| 2018/0040240 A1* | 2/2018 | Newman | B60Q 5/005 |
| 2018/0206055 A1* | 7/2018 | Di Censo | H04R 3/12 |

* cited by examiner

PHONE STAND USING A PLURALITY OF DIRECTIONAL SPEAKERS

BACKGROUND OF THE INVENTION

Field

This invention relates generally to a phone stand, and more specifically a voice-oriented conversation speaker system based on a plurality of directional speakers.

Related Art

Uses of audio in a vehicle had been limited in the past. Drivers listened to radios and cassette tape or CD players; while operators of transportation vehicles used special voice devices for announcements and communication. With advances in mobile computing and digital radio, today's drivers engage a much larger number of activities involving voice and audio. They use in-car digital and often interactive entertainment system, high definition digital radio, voice-activated navigation system, in-car voice assistants, cell phones for phone calls, voice recording, voice messaging, voice mail and notification retrieval, music streaming and other voice and audio-based phone applications ("apps").

Despite the increase of voice and audio usage, a vehicle fundamentally is noisy, due in part to wind, engine noise, echo and external noise. When a driver is engaged in a phone call using speaker phone of her cell phone, she can hardly hear the sound of the other caller, while her voice is drowned in the ambient noise when picked up by the phone's microphone. The driver constantly adjusts the volume of the radio or speakers to be louder to drown the noise. He may miss a turn announced by the navigation system, or gets frequently frustrated when the in-car system's voice assistant repeatedly fails to understand his commands or questions.

A noisy environment is not unique to a car or bus. Workers often find similar situations in a work area. Using a voice or audio device such as a phone in a noisy work place is difficult and frustrating.

The above scenarios illustrate the need for a phone stand that assists a phone in providing voice and audio clarity.

BRIEF SUMMARY OF THE INVENTION

Disclosed herein is a phone stand using a plurality of directional speakers and a corresponding method and computer readable medium as specified in the independent claims. Embodiments of the present invention are given in the dependent claims. Embodiments of the present invention can be freely combined with each other if they are not mutually exclusive.

According to one embodiment of the present invention, a phone stand includes: a phone holder for coupling to a phone, the phone for conducting a voice session; a plurality of directional speakers positioned to project sound to a focused audio area corresponding to a location where a user is expected to be positioned; one or more other speakers; and a system controller. The system controller is configured to: receive audio signals of the voice session from the phone; separate the audio signals into speech signals and non-speech signals; obtain one or more output mixing attributes; generate mixed signals by combining the speech signals and the non-speech signals according to the one or more output mixing attributes; and send the mixed signals to the plurality of directional speakers.

In one aspect of the present invention, the phone stand further includes one or more microphones configured to capture a user's speech as sound signals and to send the sound signals to the system controller. The system controller is further configured to: separate the sound signals into second speech signals and second non-speech signals; obtain one or more input mixing attributes; generate second mixed signals by combining the second speech signals and the second non-speech signals according to the input mixing attributes; and send the second mixed signals to the phone.

In one aspect of the present invention, the output mixing attributes include one or more of the following: an attribute for increasing a volume of the speech signals; an attribute for reducing a volume of the non-speech signals; an attribute for eliminating the non-speech signals; an attribute for maintaining the volume of the non-speech signals; an attribute for eliminating the non-speech signals if the speech signals are present; and an attribute for increasing a clarify of the speech signals.

In one aspect of the present invention, the system controller is further configured to receive an incoming session indication from the phone notifying the system controller of the voice session and to announce the incoming session indication using the plurality of directional speakers. The phone stand further includes one or more microphones configured to capture speech from a user in response to the announced incoming session indication and to send sound signals of the captured speech to the system controller. The system controller is further configured to determine that the sound signals comprise an acceptance or a decline of the voice session and to send the acceptance or the decline in an incoming session response message to the phone.

In one aspect of the present invention, the one or more other speakers include non-directional speakers, and the system controller is further configured to send the speech signals in the mixed signals to the plurality of directional speakers and to send the non-speech signals in the mixed signals to the one or more other speakers.

In one aspect of the present invention, the focused area comprises any one of the following: an area away from a dashboard of a vehicle; an area away from a passenger side compartment box of the vehicle; and an area behind a head rest of a seat in a vehicle.

In one aspect of the present invention, the voice session comprises a voice call.

In one aspect of the present invention, the audio signals received by the system controller include a first indication labeling a first portion of the audio signals as the speech signals and a second indication labeling a second portion of the audio signals as the non-speech signals.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
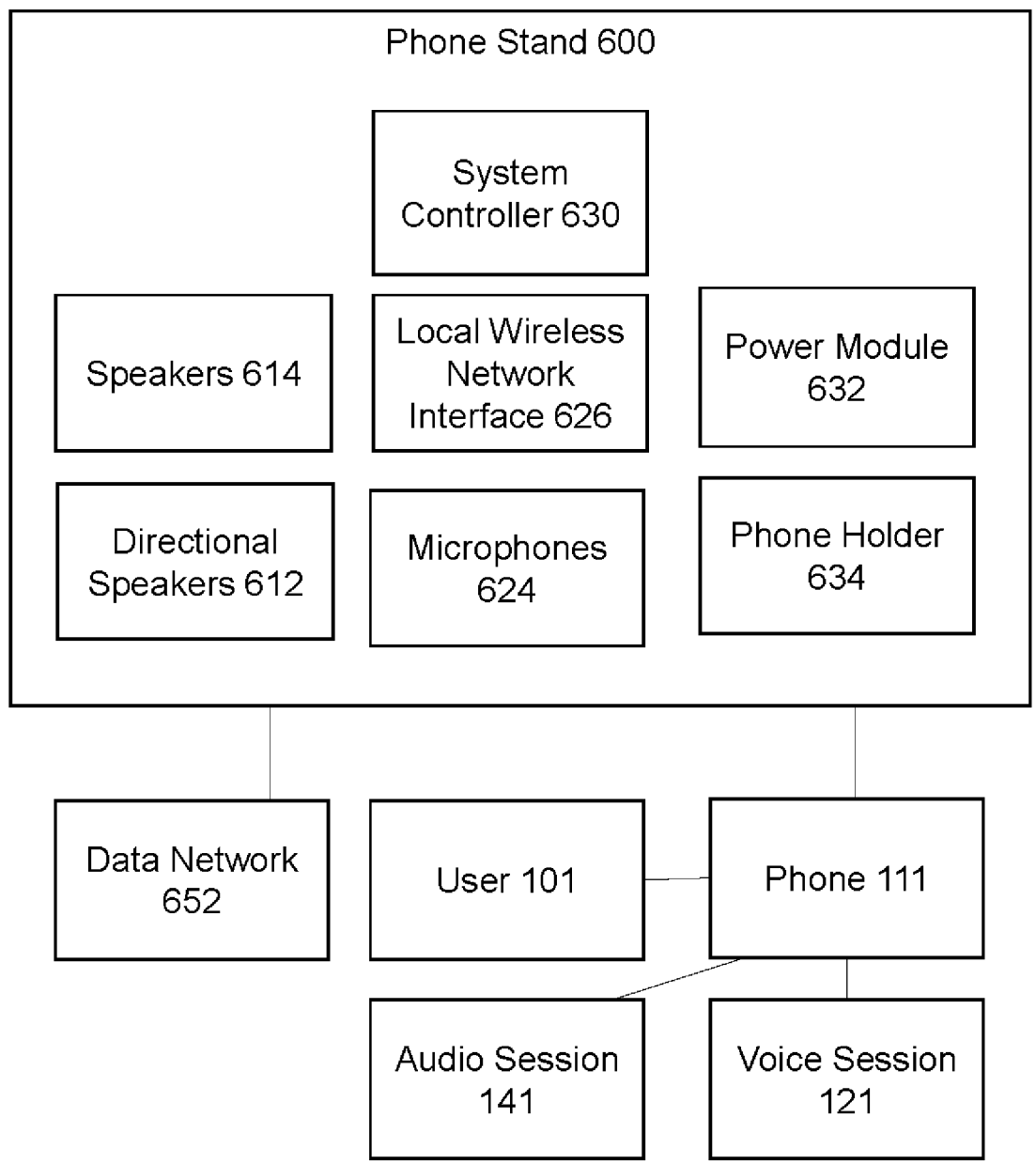
FIG. 1 illustrates an exemplary embodiment of a phone stand computing system according to the present invention.

FIG. 1 illustrates an exemplary embodiment of a phone stand computing system according to the present invention. In one embodiment, phone stand 600 coupled to or physically holds a phone 111 and assists in the use of a phone 111 by processing a voice session 121 or an audio session 141. In one embodiment, phone stand 600 includes local wireless network interface 616 through which the phone stand 600 is able to wirelessly connect directly to phone 111 when phone 111 is within connection range of the phone stand 600. In one embodiment, phone stand 600 includes a phone holder 634 which includes a clip, cradle, magnetic mount, or other similar device, to physically hold phone 111. In one embodiment, phone holder 634 connects to power module 632, included in phone stand 600, such that phone holder 634 can electrically charge phone 111 when phone 111 is held by phone holder 634. In one embodiment, power module 632 of phone stand 600 provides power to one or more components of phone stand 600. In one embodiment, phone stand 600 includes a plurality of directional speakers 612 which are placed on phone stand 600 and provides a focused audio area when audio signals are played using directional speakers 612. In one embodiment, the focused audio area is a physical location or area where a user 101 is expected to be positioned in order to listen to the audio output of phone stand 600. In one embodiment, phone stand 600 includes one or more additional speakers 614, which may or may not be directional speakers. In one embodiment, speakers 614 includes non-directional speakers. In one embodiment, phone stand 600 uses directional speakers 612 for voice session 121 and audio session 141. In one embodiment, phone stand 600 uses directional speakers 612 and optionally speakers 614 for audio session 141. In one embodiment, phone stand 600 includes one or more microphones 624 to receive sound signals for processing voice session 121 and/or audio session 141. A voice session, as used herein, refers to a span of time defined by a start marker (such as a start time or start command) and an end marker (such as an end time or an end command) during which voice signals are processed. An audio session, as used herein, refers to a span of time defined by a start marker (such as a start time or start command) and an end marker (such as an end time or an end command) during which non-voice signals are processed. The system controller 630 may be a computing device, as described below with reference to FIG. 2.

In one embodiment, phone stand 600 includes a system controller 630, which includes a hardware processor configured with processing capabilities and a storage for storing computer programming instructions, which when executed by the processor of system controller 630, allows system controller 630 to control directional speakers 612, speakers 614, phone holder 634, power module 632, microphones 624 and local wireless network interface 626. In one embodiment, system controller 630 interacts with phone 111 over one or more data communication sessions via local wireless network interface 626 to phone 111 to process voice session 121 and audio session 141. A communication session, as used herein, refers to a series of interactions between two communication end points that occur during the span of a single connection.

In one embodiment, phone stand 600 connects to a data network 652. In one embodiment phone 111 connects to data network 652.

Figure 2:
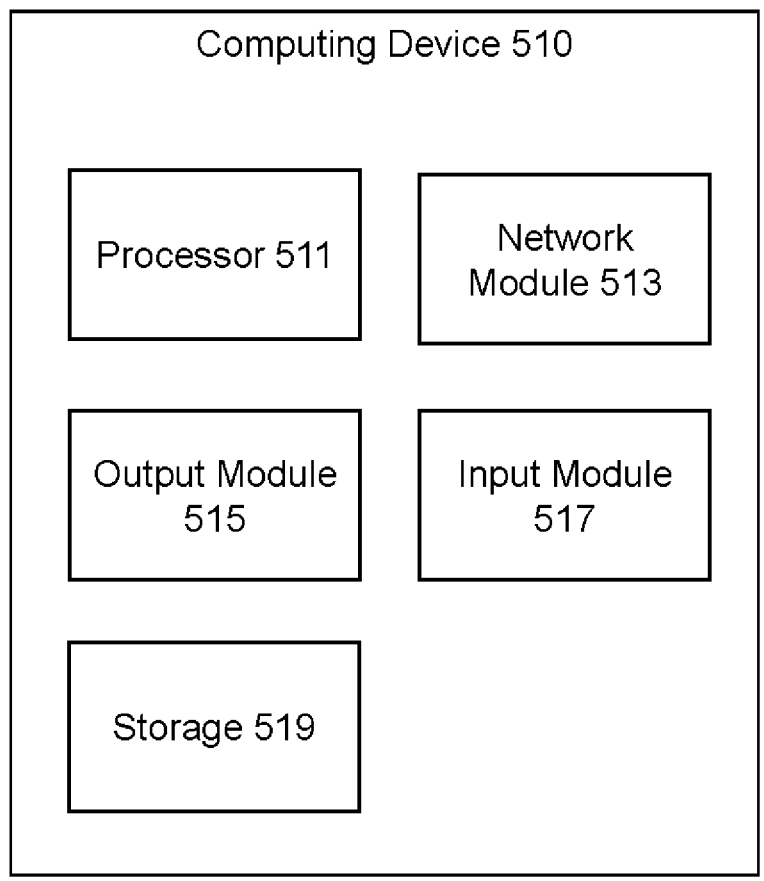
FIG. 2 illustrates an exemplary embodiment of a computing device according to the present invention.

FIG. 2 illustrates an exemplary embodiment of hardware components of a computing device which can be used for a controller, a network computer, a server or a phone. In one embodiment, computing device 510 includes a hardware processor 511, a network module, an output module 515, an input module 517, a storage 519, or some combination thereof. In one embodiment, the hardware processor 511 includes one or more general processors, a multi-core processor, an application specific integrated circuit based processor, a system on a chip (SOC) processor, an embedded processor, a digital signal processor, or a hardware- or application-specific processor. In one embodiment, output module 515 includes or connects to a display for displaying video signals, images or text, one or more speakers to play sound signals, or a lighting module such as an LED. In one embodiment, output module 515 includes a data interface such as USB, HDMI, DVI, DisplayPort, thunderbolt or a wire-cable connecting to a display, or one or more speakers. In one embodiment, output module 515 connects to a display or a speaker using a wireless connection or a wireless data network. In one embodiment, input module 517 includes a physical or logical keyboard, one or more buttons, one or more keys, or one or more microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors.

In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware, software, or a combination of hardware and software, to interface or connect to a wireless data network such as a cellular network, a mobile network, a Bluetooth network, a NFC network, a personal area network (PAN), a WiFi network, or a Li-Fi network. Storage 519 stores executable instructions, which when read and executed by the processor 511 of computing device 510, implements one or more functionalities of the current invention.

Figure 3A:
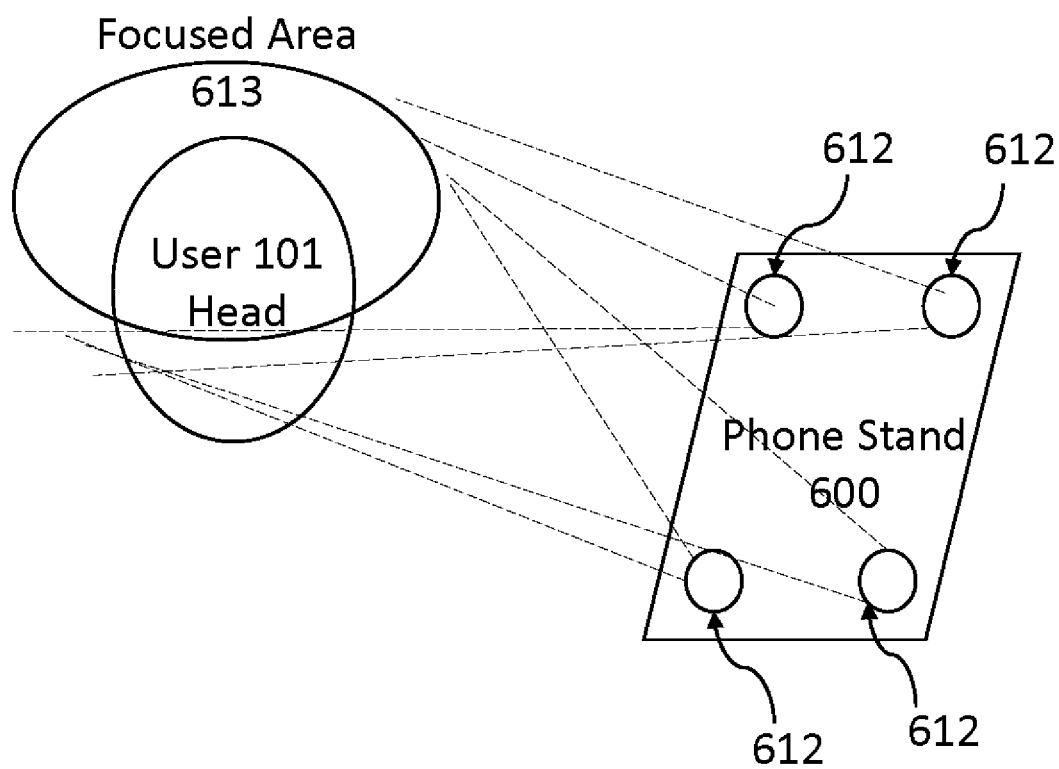
FIGS. 3a-3b illustrate exemplary embodiments of directional speakers of the phone stand according to the present invention.
Figure 3B:
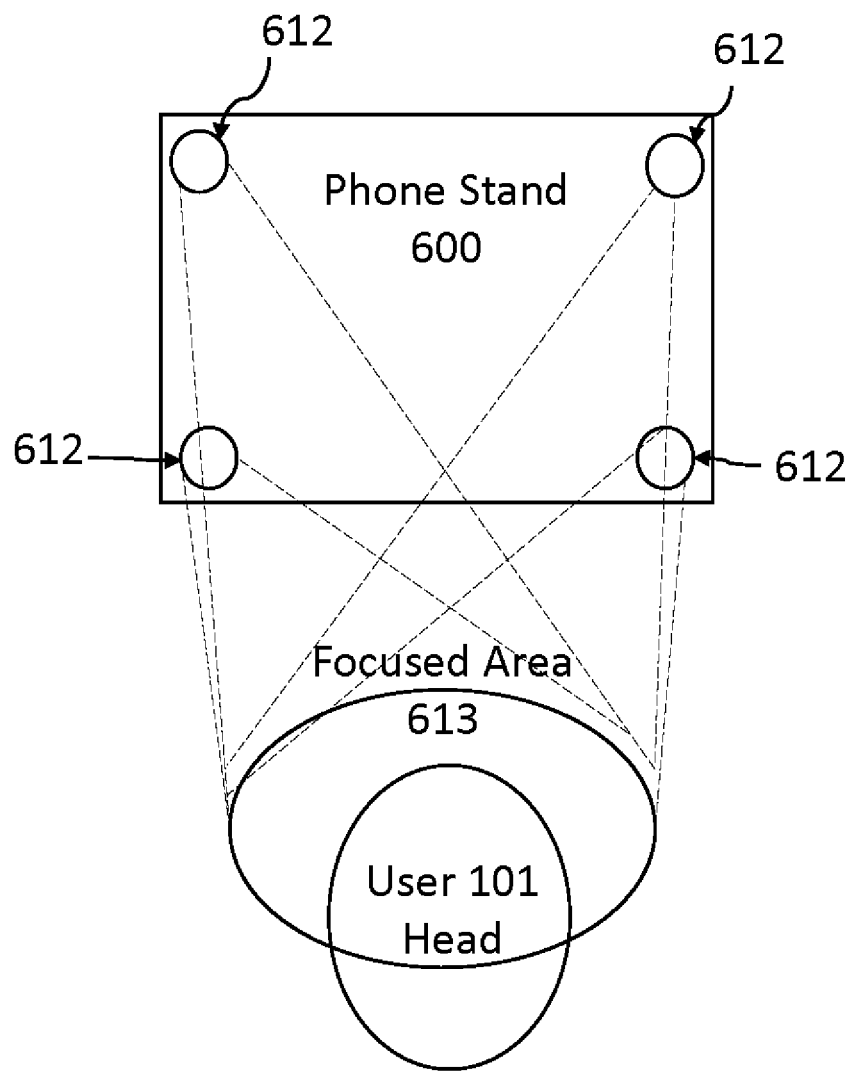

FIGS. 3a-3b illustrate exemplary embodiments of directional speakers of the phone stand according to the present invention. In one embodiment, directional speakers 612 include a plurality of speakers or one or more speaker arrays. In one embodiment, directional speakers 612 includes two or more parametric speakers. In one embodiment, directional speakers 612 includes two or more small speakers. Each of the speakers of directional speakers 612 are positioned in a certain direction such that directional speakers 612 project sound to a small focused area 613 corresponding to a location where the head of user 101 is expected to be positioned in order to clearly hear sound produced by directional speakers 612. In one embodiment, directional speakers 612 create a sound interference to aggregate the sound waves from the directional speakers 612 so that the sound is louder or amplified in the focused area 613. In one embodiment, each of the speakers in directional speakers 612 is mounted in the phone stand 600 so that each speaker narrowly projects sound in the direction of the focused area 613. In one embodiment, the focused area 613 is about 18-30 inches away from phone stand 600. In one embodiment, the focused area 613 is about 6-15 inches above or below phone stand 600. In one embodiment, the focused area 613 includes an area away from a dashboard, an area away from a passenger side compartment box, or an area behind the head rest of a seat in a vehicle. In one embodiment, the focused area 613 includes an area away from a laptop or a computer monitor. In one embodiment, the focused area 613 includes an area away from a piece of equipment, operator controls, or monitors.

Returning to FIG. 1, in one embodiment, power module 632 includes a charging unit to charge phone 111. In one embodiment, the charging unit includes a wireless charging unit or a charging connector. In one embodiment, power module 632 includes a battery. In one embodiment, power module 632 connects to an external power source.

In one embodiment, local wireless network interface 626 connects to one or more of a NFC network, a Bluetooth network, a PAN network, an 802.11 network, an 802.15 PAN network, a ZeeBee network a LiFi network, and a short distance wireless network connecting two close-by networking devices.

In one embodiment, data network 652 includes a cellular network, a mobile data network, a WiFi network, a LiFi network, a WiMAX network, an Ethernet, or any other data network.

In one embodiment, phone 111 can be a mobile phone, a cell phone, a smartphone, an office desk phone, a VoIP phone, a cordless phone, a professional phone used by a train operator, bus driver, or a truck driver.

In one embodiment, voice session 121 is a voice call session, a telephone call session, a teleconference session, a voice message exchange session, a VoIP call session, a voice over instant messaging (IM) session, a session with a voice assistant application such as Apple Sir, Google Now, Amazon Alexa, Microsoft Cortana, or other voice assistant. In one embodiment, voice session 121 is a voice recording session, a text to speech session, an audio book reading session, playing a podcast, or a voice announcement.

In one embodiment, audio session 141 includes a voice session, a music playing session, a session playing radio, a video session playing audio, a session where audio clip is played. In one embodiment, audio session 141 includes a plurality of combined voice sessions and other audio sessions.

In one embodiment, user 101 is a car driver, a bus driver, a vehicle passenger, a pilot, an operator operating a bus, a train, a truck, a ship, or a vehicle. In one embodiment, user 101 is an office clerk, a receptionist, or an office worker. In one embodiment, user 101 stays in a noisy environment where user 101 is to conduct a voice session 121 or audio session 141 with clarity.

Figure 4:
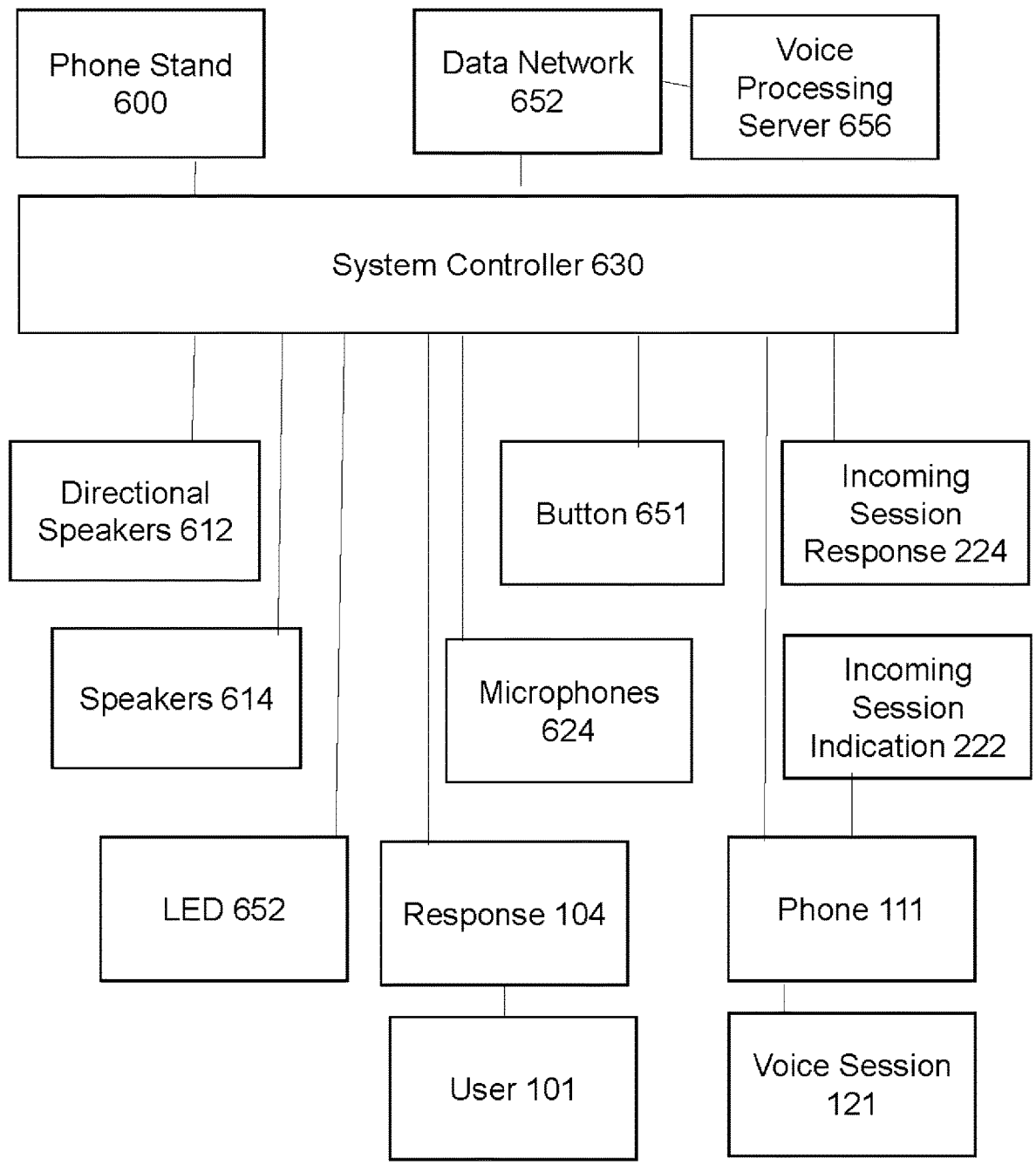
FIG. 4 illustrates an exemplary embodiment of a process for receiving an incoming voice session according to the present invention.

FIG. 4 illustrates an exemplary embodiment of a process for receiving an incoming voice call or voice session according to the present invention. In one embodiment, phone 111 receives a voice session 121 request from a caller or establishes voice session 121 to another user. In one embodiment, phone 111 is configured to use phone stand 600 as a speakerphone for voice session 121. In one embodiment, phone 111 sends an incoming session indication 222 to system controller 630, which notifies the system controller 630 of an incoming voice session 121. In one embodiment, system controller 630 receives incoming session indication 222 and announces the incoming session indication 222. In one embodiment, in announcing the incoming session indication 222, system controller 630 plays a ring tone using directional speakers 612. In one embodiment, incoming session indication 222 includes a plurality of audio signals for a ring tone, and system controller 630 plays the plurality of audio signals of incoming session indication 222 over directional speakers 612. In one embodiment, incoming session indication 222 includes a ring tone identity, and system controller 630 retrieves a ring tone matching the ring tone identity from a storage of phone stand 600, and plays the retrieved ring tone over directional speakers 612. In one embodiment, system controller 630 plays the ring tone using speakers 614. In one embodiment, phone stand 600 includes an LED 622, and system controller 630 lights up LED 652 as a notification of an incoming session.

In one embodiment, user 101 notices the announcement of incoming session indication 222 through lit-up LED 652, or ring tone played on directional speakers 612 or speakers 614. In one embodiment, user 101 responds to the indication 222 with a response 104 to accept, reject or disconnect voice session 121. In one embodiment, the response 104 includes the user 101 speaking into microphones 624 or pressing a button 651 on phone stand 600. In one embodiment, response 104 indicates an acceptance of the voice session 121. In one embodiment, user 101 speaks "answer the call", "accept", "yes", "hello", or another spoken phrase to accept to voice session 121. Microphones 624 captures sound signals corresponding to response 104 and sends response 104 to system controller 630. In one embodiment, system controller 630 processes response 104 using natural language processing and recognizes the spoken words of user 101. System controller 630 matches the spoken words to one or more pre-stored words or sequences of words in an ontology database (not shown) to determine that response 104 to indicates an acceptance of the voice session 121. System controller 630 sends the acceptance in an incoming session response 224 message to phone 111. In one embodiment, system controller 630 includes the sound signals of the response 104, as captured by microphones 624, into incoming session response 224, and sends the incoming session response 224 to phone 111. The phone 111 processes the sounds signals in the incoming session response 224 to determine if response 104 indicates an acceptance, a rejection or a disconnection of the voice session 121. In one embodiment, system controller 630 sends response 104 to a voice process server 656 over data network 652 to determine if response 104 indicates an acceptance, a rejection or a disconnection of the voice session 121.

In one embodiment, user 101 does not need to do anything to accept, decline or disconnect voice session 121. Phone 111 automatically continues or discontinues voice session 121. In one embodiment, phone 111 is configured to automatically accept the voice session 121 after a pre-determined period of time, or after a pre-determined number of rings. In one embodiment, phone 111 receives a disconnect indication over the voice session 121. In one embodiment, voice session 121 is a voice call and phone 111 receives a disconnect indication after the remote caller or system disconnects the voice call. In one embodiment, voice session 121 is to play a voice message and phone 111 discontinues voice session 121 after playing the voice message.

In one embodiment, the pressing of a button 651 indicates an acceptance of a voice call. System controller 630 detects the pressing of the button 651 and sends an incoming session response 224 indicating an acceptance of the voice session 121 to phone 111.

In one embodiment, user 101 wants to decline or disconnect voice session 121. In one embodiment, user 101 says "no", "decline", "hang up", "bye", "disconnect" or other word or word phrase to indicate rejection of voice session 121. In one embodiment, microphone 624 captures sound signals corresponding to response 104. In one embodiment, system controller 630 receives the captured sound signals from microphone 624 and processes the sound signals using natural language processing to determine that the response 104 indicates a rejection of voice session 121. System controller 630 includes an indication to drop the voice session 121 in the incoming session response 224 and sends the incoming session response 224 to the phone 111. In one embodiment, the indication includes a command, a message, a flag, an integer, or a tag. In one embodiment, system controller 630 sends captured sound signals corresponding to the response 104 to phone 111, and the phone 111 then processes the sound signals to determine whether the response 104 indicates a rejection of the voice session 121.

In one embodiment, the pressing of the button 651 declines a call. System controller 630 detects the pressing of the button 651 and sends an incoming session response 224 indicating a rejection of the voice session 121 to phone 111.

In one embodiment, phone 111 receives incoming session response 224. In one embodiment, phone 111 determines that the incoming session response 224 is a rejection of the voice session 121, and in response, phone 111 rejects voice session 121. In one embodiment, phone 111 rejects the voice session 121 by disconnecting the voice session 121. In one embodiment, phone 111 sends a rejection indication over voice session 121 to the caller. In one embodiment, phone 111 determines that the incoming session response 224 is an acceptance of the voice session 121, and in response, the phone 111 sends an acceptance indication over voice session 121 to the caller or the callee.

Figure 5:
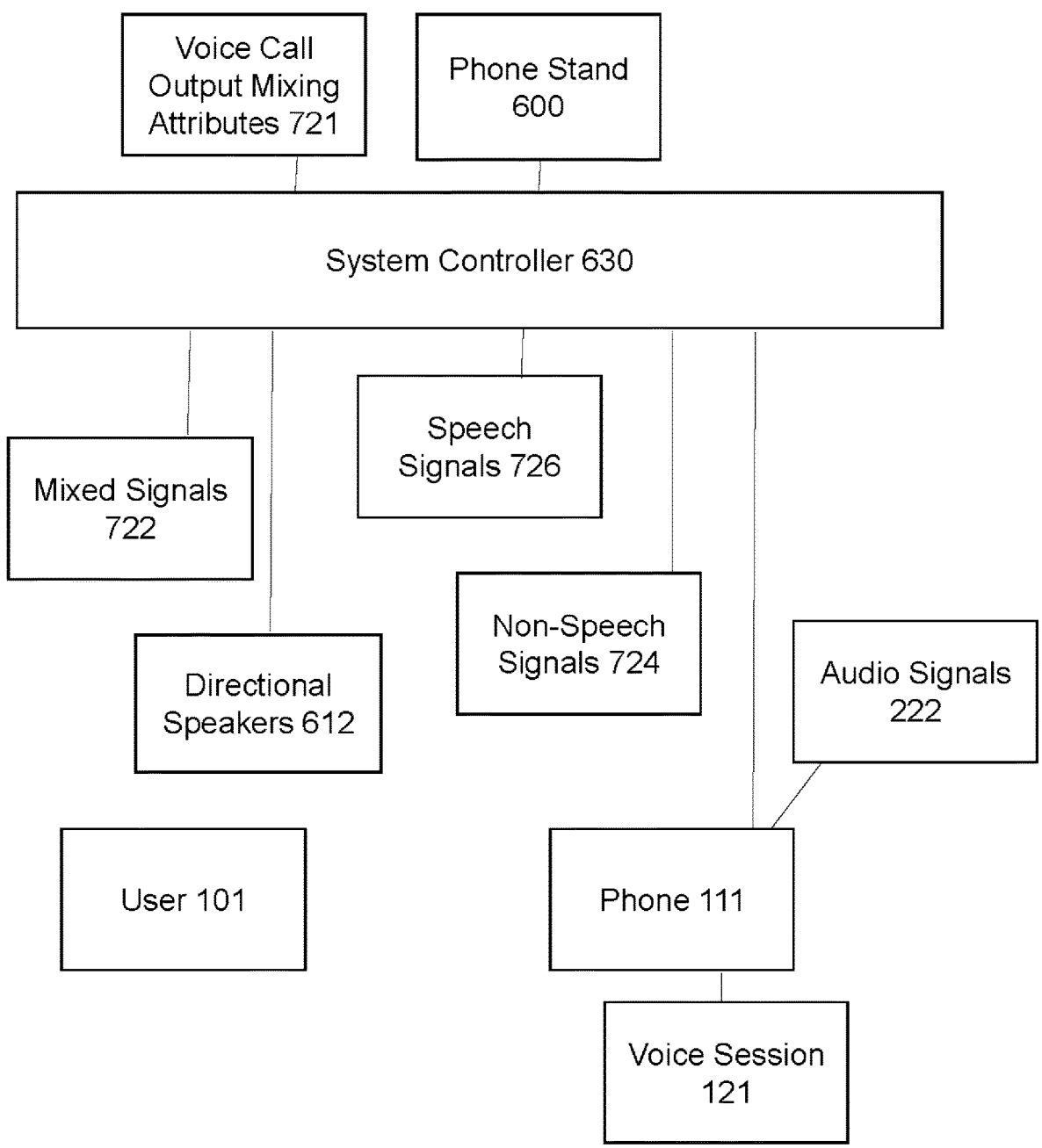
FIG. 5 illustrates an exemplary embodiment of a process for processing audio signals received from the phone according to the present invention.

FIG. 5 illustrates an exemplary embodiment for a processing of audio signals received from the phone during a voice session according to the present invention. In this embodiment, phone 111 receives audio signals 222 over voice session 121, established as described above with reference to FIG. 4. Phone 111 sends audio signals 222 to phone stand 600. In one embodiment, system controller 630 receives audio signals 222 from phone 111. System controller 630 processes audio signals 222 and separates audio signals 222 into speech signals 726 and non-speech signals 724. In one embodiment, audio signals 222 includes a first indication labeling a first portion of the audio signals 222 as speech signals 726 and a second indication labeling a second portion of the audio signals 222 as non-speech signals 724. In one embodiment, audio signals 222 includes a channel for speech signals 726 and a channel for non-speech signals 724. In one embodiment, system controller 630 identifies audio signals 222 as speech signals 726 and determines there are no non-speech signals 724 in the audio signals 222. In one embodiment, system controller 630 includes one or more voice call output mixing attributes 721. System controller 630 generates mixed signals 722 by combining speech signals 726 and non-speech signals 724 according to output mixing attributes 721. In one embodiment, output mixing attributes 721 includes one or more attributes for increasing the volume of speech signals 726, for reducing the volume of non-speech signals 724, for eliminating non-speech signals 724, for maintaining a volume of non-speech signals 724 if speech signals 726 are absent, for eliminating non-speech signals 724 if speech signals 726 are present, or some combination thereof. System controller 630 generates mixed signals 722 according to the output mixing attributes 721 such that the clarity for speech signals 724 is increased. Upon generating mixed signals 722, system controller 630 plays mixed signals 722 via directional speakers 612. In one embodiment, output mixing attributes 721 includes a mixed signal volume adjustment attribute. In one embodiment, system controller 630 adjusts the volume of mixed signals 722 according to the mixed signal volume adjustment attribute such that the volume is not too loud for user 101, who is assumed to be positioned in the focused area of directional speakers 612 and listening to the sound of mixed signals 722. In one embodiment, output mixing attributes 721 adjusts volume of speech signals 726 higher than non-speech signals 724. In one embodiment, mixed signals 722 are sent over to directional speakers 612 such that speech signals 726 is played louder than non-speech signals 724. In one embodiment, speech signals in mixed signals 722 are sent over to directional speakers 612 and non-speech signals in mixed signals 722 are sent over to speakers 614.

In one embodiment, phone 111 generates audio signals 222 to include: a first indication labeling a first portion of the audio signals 222 as speech signals 726 or a first channel for speech signals 726; and a second an indication labeling a second portion of the audio signals 222 as non-speech signals 724 or a second channel for non-speech signals 724. In one embodiment, phone 111 receives audio signals 222 from voice session 121, and the received audio signals 222 includes: a first indication labeling a first portion of the audio signals 222 as speech signals 726 or a first channel for speech signals 726; and a second indication labeling a second portion of audio signals 222 as non-speech signals 724 or a second channel for non-speech signals 724. In one embodiment audio signals 222 includes a Dolby multi-channel format for encoding speech signals 726 into a dialogue channel and non-speech signals 724 into a non-dialogue channel. In one embodiment, the system controller 630 plays the dialogue channel over the directional speakers 612 and plays the non-dialogue channel over the speakers 614. In one embodiment, audio signals 222 includes a different multi-channel or multiple sub-sessions formats to encode speech signals 726 and non-speech signals 724.

Figure 6:
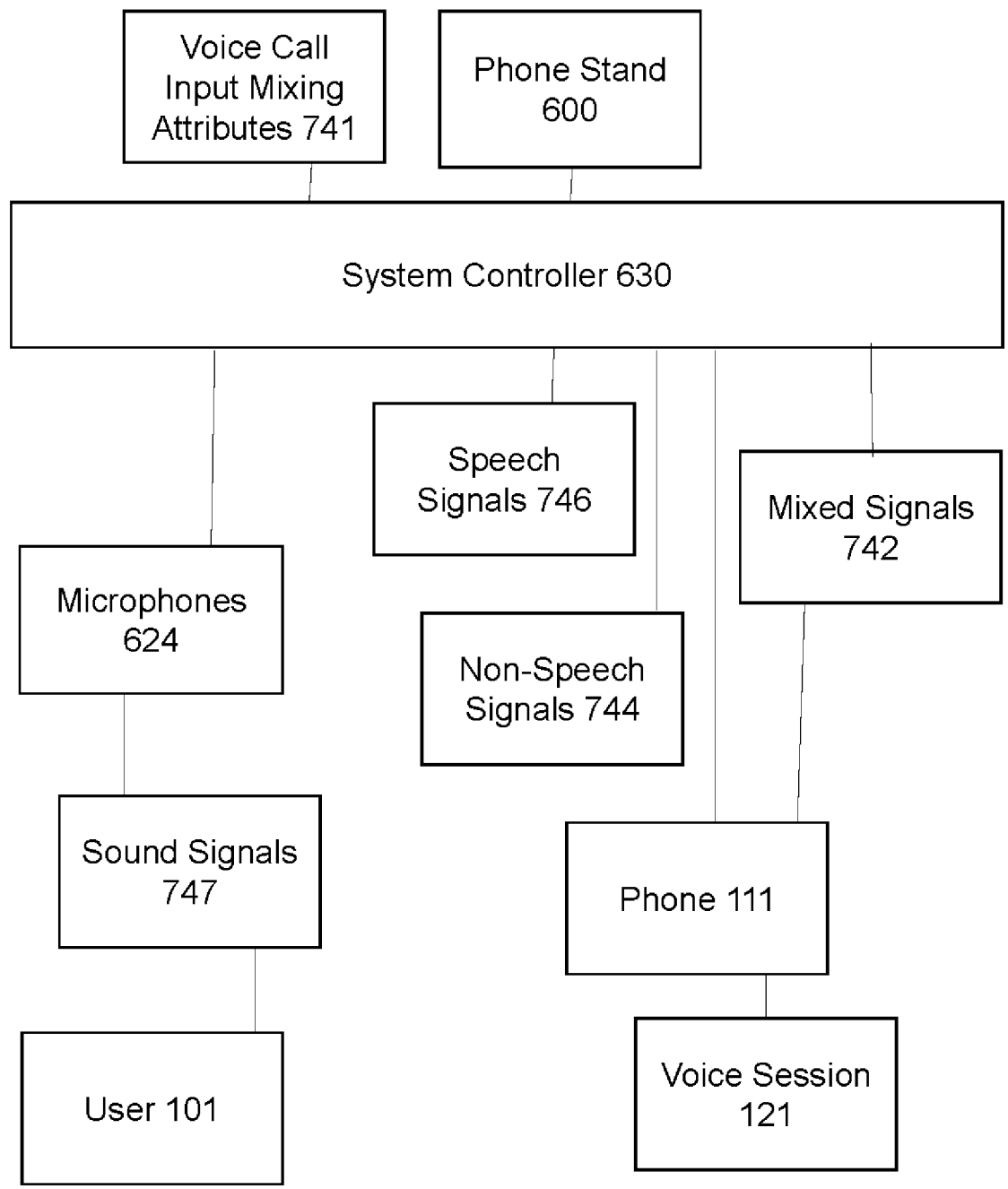
FIG. 6 illustrates an exemplary embodiment of a process for sending audio signals to the phone according to the present invention.

FIG. 6 illustrates an exemplary embodiment of a process for sending audio signals to the phone according to the present invention. In this embodiment, user 101 speaks into microphone 624 during voice session 121. In one embodiment, microphones 624 capture the user's speech as sound signals 747 and sends the sound signals 747 to system controller 630. System controller 630 processes sound signals 747 and separates sound signals 747 into speech signals 746 and non-speech signals 744. In one embodiment, system controller 630 stores or has access to a storage with one or more voice call input mixing attributes 741. System controller 630 generates mixed signals 742 by combining speech signals 746 and non-speech signals 744 according to input mixing attributes 741. In one embodiment, input mixing attributes 741 includes one or more attributes for increasing the volume of speech signals 746, for reducing the volume of non-speech signals 744, for eliminating non-speech signals 744, for eliminating non-speech signals 744 if speech signals 746 are absent, for eliminating non-speech signals 746 if speech signals 746 are present, or some combination thereof. System controller 630 generates mixed signals 742 according to the input mixing attributes 741 such that the clarity of speech signals 746 are increased. Upon generating mixed signals 742, system controller 630 sends mixed signals 742 to phone 111. In one embodiment, phone 111 receives mixed signals 742 and sends mixed signals 742 over voice session 121. In one embodiment, mixed signals 742 includes a first indication labeling a first portion of mixed signals 742 as speech signals 746 and a second indication labeling a second portion of mixed signals 742 as non-speech signals 744. In one embodiment, mixed signals 742 includes a multi-channel format to encode speech signals 746 and non-speech signals 744. In one embodiment, sound signals 747 includes only speech signals 746.

In one embodiment, microphones 624 include a directional microphone facing an assume position of user 101, or a particular microphone closer to the assumed position of the user 101 than the other microphones. System controller 630 identifies the speech signals 746 that are in sound signals 747 received from the directional or particular microphone. In one embodiment, microphones 624 include a particular microphone located further away from the assumed position of the user 101, and optionally where the particular microphone is shielded from sound made by user 101. System controller 630 identifies the non-speech signals 744 in sound signals 747 received from the particular microphone.

In one embodiment, input mixing attributes 741 includes a mixed signal volume adjustment attribute 742. In one embodiment, system controller 630 increases the volume of mixed signals 742 prior to sending mixed signals 742 to phone 111 according to the mixed signal volume adjustment attribute 742.

Figure 7:
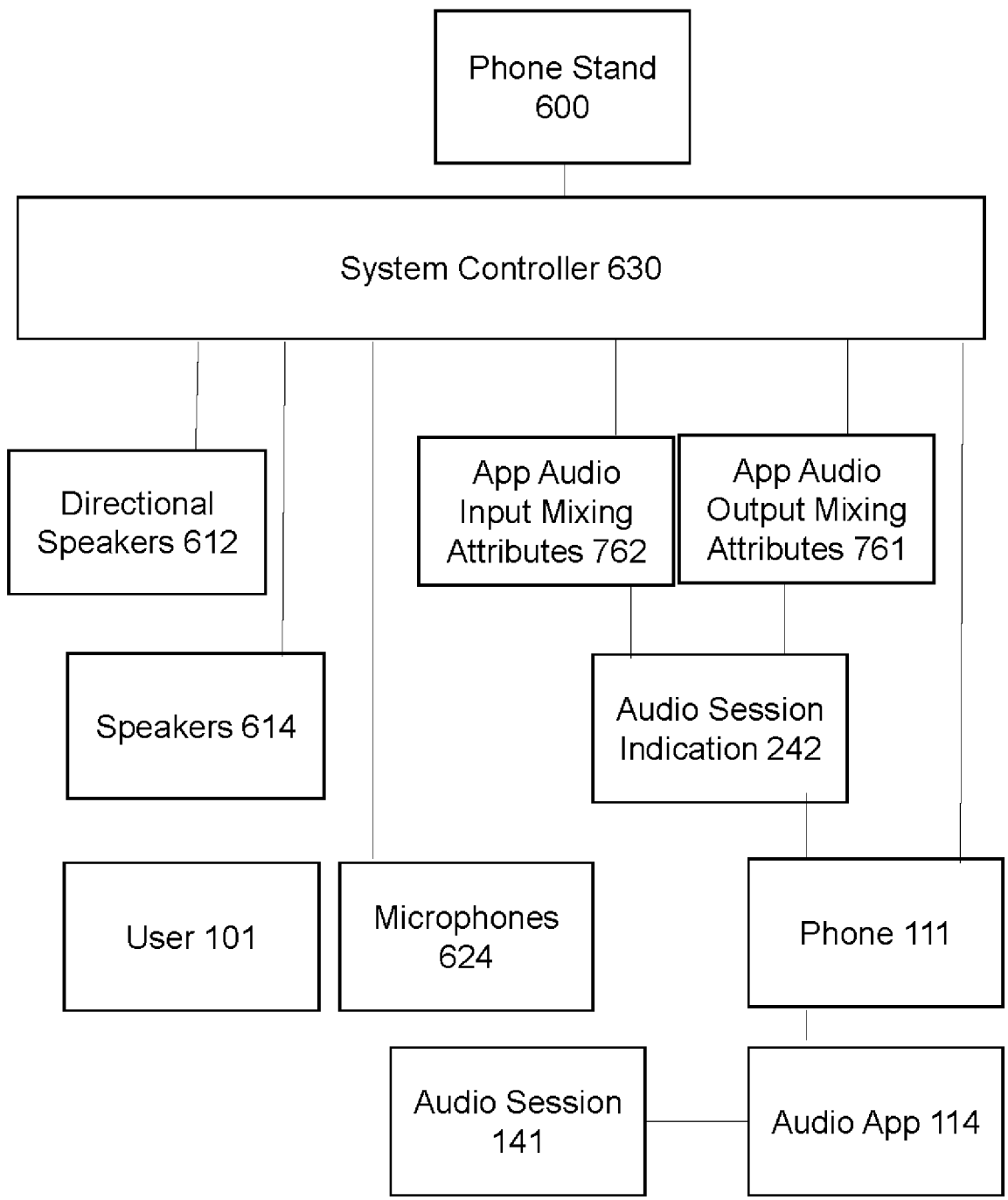
FIG. 7 illustrates an exemplary embodiment of a process for interworking with an audio-based phone application according to the present invention.

FIG. 7 illustrates an exemplary embodiment of a process for interworking with an audio-based phone application according to the present invention. In this embodiment, phone 111 executes an audio application ("app") 114. In one embodiment, app 114 includes a smartphone app, a tablet app, an iOS™ app, an Android™ app, a Windows™ app, an Apple™ CarPlay™ app, a Google™ Android Auto app, or any app of a mobile, in-car, or embedded system. In one embodiment, app 114, when executed by phone 111, conducts an audio session 141. In one embodiment, app 114 includes a media player, a music player, a video player, a voice assistant, a phone dialer, a voice messenger, a voice mail controller, a VoIP client, a voice chat, teleconferencing or group conferencing functionality, an audio-book reader, a radio, or text-to-speech functionality. In one embodiment, audio app 114 starts an audio session 141, and notifies phone 111 to start audio session 141. In one embodiment, phone 111 sends an audio session indication 242 message to phone stand 600. In one embodiment, audio session indication 241 includes a start marker. In one embodiment, audio session indication 242 includes a speaker choice indicating either a choice of directional speakers 612 or speakers 614 are to be used for the audio session 141. In one embodiment, audio session indication 242 includes one or more app audio output mixing attributes 761 for mixing audio signals to be outputted by the app 114 and optionally one or more app audio input mixing attributes 762 for mixing of audio signals inputted to the app 114. In one embodiment, system controller 630 receives audio session indication 242, optionally retrieves and stores speaker choice indication, and optionally retrieves and stores app audio input mixing attributes 762 and app audio output mixing attributes 761. In one embodiment, system controller 630 stores or has access to storage with app audio input mixing attributes 762 and app audio output mixing attributes 761. Phone 111 includes an audio input mixing attribute identity in audio session indication 242 to allow system controller 630 to select the app audio input mixing attributes 762 or app audio output mixing attributes 761 based on the identity in audio session indication 242. In one embodiment, system controller 630 uses app audio output mixing attributes 761 with speakers 614 and directional speakers 612, as described below. In one embodiment, system controller 630 uses app audio input mixing attributes 762 with microphone 624, as described below.

In one embodiment, audio app 114 instructs phone 111 to end audio session 141, and in response, phone 111 sends audio session indication 242 to include an ending indication. In one embodiment, the indication comprises a command, a message, a flag, an integer, or a tag. In one embodiment, system controller 630 receives the ending indication, and in response, stops applying mixing the audio signals to be outputted by the app 114 or inputted to the app 114.

In one embodiment, system controller 630 announces audio session indication 242 using speakers 614, directional speaker 612, or an LED light.

Figure 8:
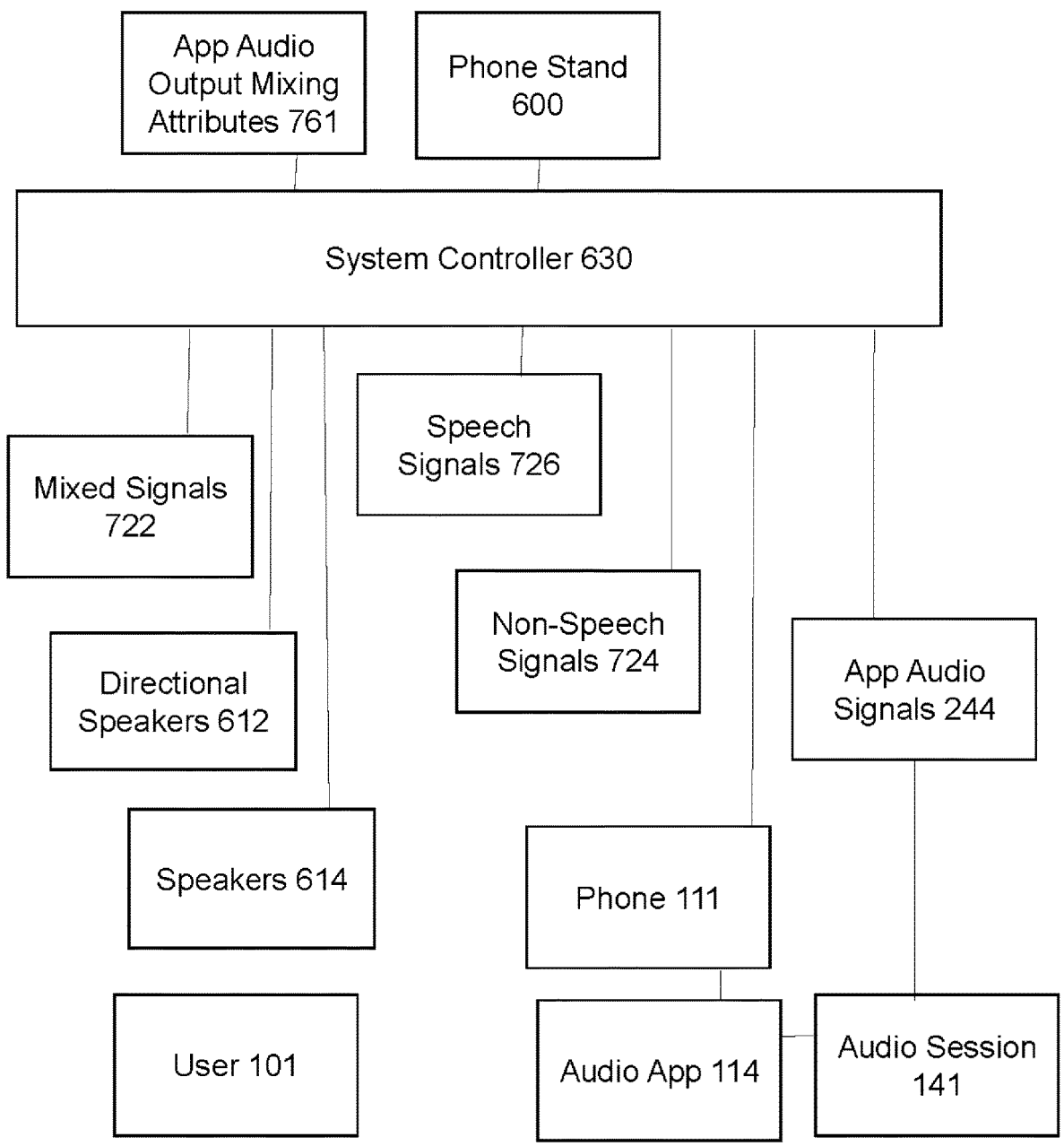
FIG. 8 illustrates an exemplary embodiment of a process for processing audio signals received from an audio-based phone application according to the present invention.

FIG. 8 illustrates an exemplary embodiment of a process for processing audio signals received from an audio-based phone app according to the present invention. In this embodiment, audio app 114 conducts an audio session 141, of which the system controller 630 of phone stand 600 is notified by phone 111, as described above with reference to FIG. 7. In one embodiment, audio app 114 generates app audio signals 244 during audio session 141. Audio app 114 sends phone 111 of app audio signals 244. In one embodiment, phone 111 sends app audio signals 244 to system controller 630. System controller 630 receives app audio signals 244, and processes app audio signals 244 according to previously stored app audio output mixing attributes 761. In one embodiment, output mixing attributes 761 contain an attribute value indicating that no processing of app audio signals 244 is to be performed by the system controller 630. System controller 630 plays app audio signals 244 over directional speakers 612 or speakers 614 according to output mixing attributes 761.

In one embodiment, output mixing attributes 761 contains an attribute value indicating that app audio signals 244 are to be separated into speech signals 726 and non-speech signals 724. Based on the output mixing attributes 761, system controller 630 processes app audio signals 244 and separates audio signals 244 into speech signals 726 and non-speech signals 724. System controller 630 then combines speech signals 726 and non-speech signals 724 according to output mixing attributes 761 to generate mixed signals 722.

In one embodiment, output mixing attributes 761 includes one or more attributes for increasing the volume of speech signals 726, for reducing the volume of non-speech signals 724, for eliminating non-speech signals 724, for maintaining volume of non-speech signals 724 if speech signals 726 are absent, for eliminating non-speech signals 724 if speech signals 726 are present, or some combination thereof. In one embodiment, system controller 630 generates mixed signals 722 according to the output mixing attributes 761 such that the clarity of speech signals 724 or the audio quality for non-speech signals 726 is increased. In one embodiment, system controller 630 plays mixed signals 722 over directional speakers 612 or speakers 614 as specified by the output mixing attributes 761. In one embodiment, system controller 630 plays mixed signals 722 using directional speakers 612 when system controller 630 determines that the speech signals 726 in the mixed signals 722 are of better quality than the non-speech signals 724. In one embodiment, system controller 630 plays mixed signals 722 using speakers 614 when system controller 630 determines that the non-speech signals 724 in the mixed signals 722 are of better quality than the speech signals 726. In one embodiment, system controller 630 plays the speech signals 726 in mixed signals 722 using directional speakers 612. In one embodiment, system controller 630 plays the non-speech signals 724 in mixed signals 722 using speakers 614.

In one embodiment, system controller 630 determines directional speakers 612 are to be used to play mixed signals 722. In one embodiment, output mixing attributes 761 includes a volume adjustment attribute. System controller 630 adjusts the volume of mixed signals 722 or app audio signals 244 according to the volume adjustment attribute so that the volume is not too loud for user 101, who is assumed to be positioned in the focused area of directional speakers 612.

In one embodiment, app audio signals 244 include: a first indication labeling a first portion of app audio signals 244 as speech signals 726 or a first channel for speech signals 726; and a second indication labeling a second portion of app audio signals 244 as non-speech signals 724 or a second channel for non-speech signals 724. In one embodiment, phone 111 modifies app audio signals 244 to include such indications or channels. In one embodiment, audio signals 244 received from audio session 141 include such indications or channels. In one embodiment, audio app 144 generates app audio signals 244 to include such indications or channels. In one embodiment, app audio signals 244 uses Dolby multi-channel format to indicate speech signals 726 in a dialogue channel and non-speech signals 724 in a non-dialogue channel. In one embodiment, app audio signals 244 uses a different channel or sub-session separation for speech signals 726 and non-speech signals 724.

Figure 9:
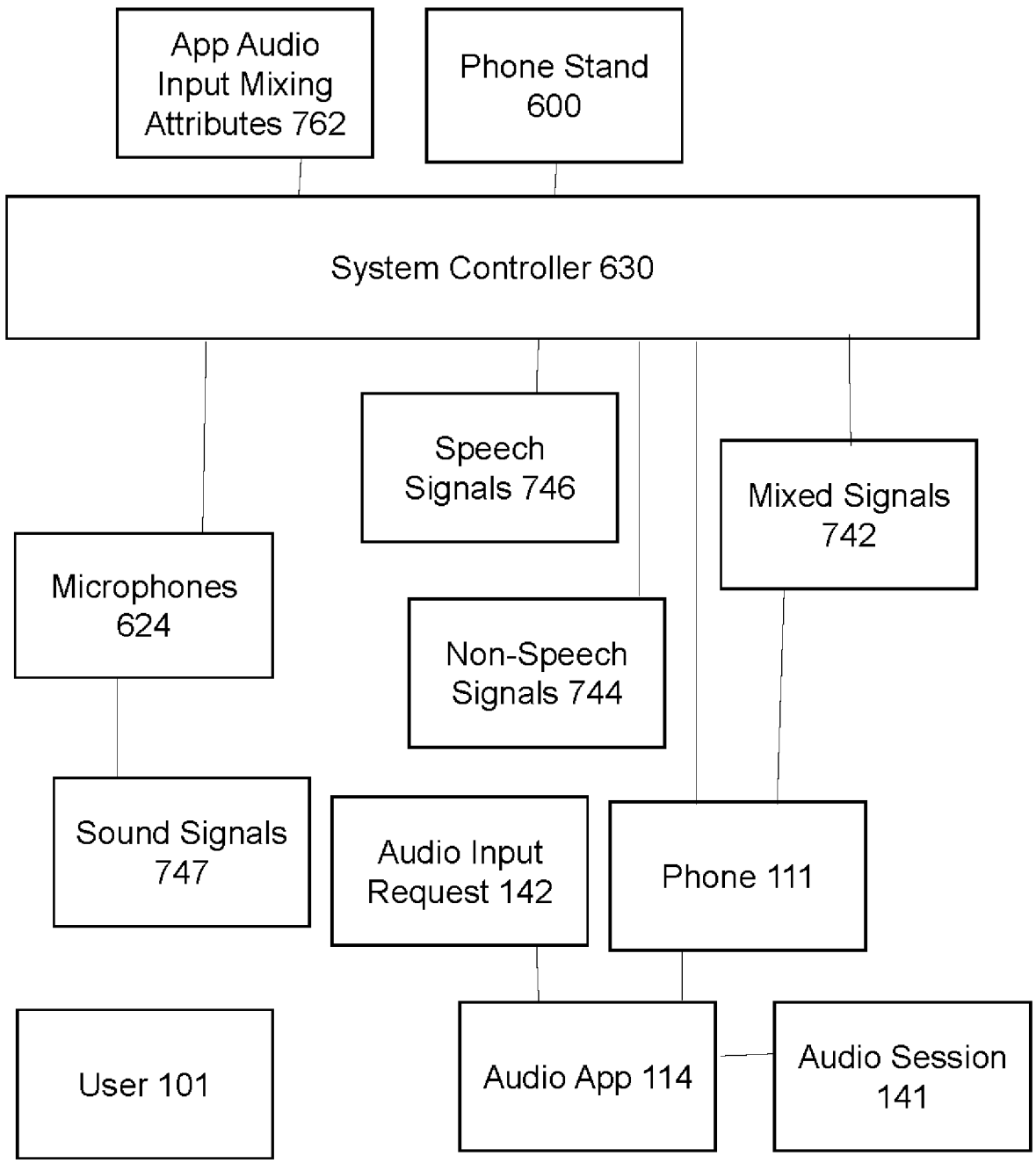
FIG. 9 illustrates an exemplary embodiment of a process for sending audio signals to an audio-based phone application according to the present invention.

FIG. 9 illustrates an exemplary embodiment of a process for sending audio signals to an audio-based phone app according to the present invention. In this embodiment, during an audio session 141, audio app 114 sends an audio input request 142 to phone 111, and in response, the phone 111 forwards audio input request 142 to system controller 630. In one embodiment, system controller 630 receives audio input request 142 and instructs microphones 624 to capture sound signals 747. In one embodiment, system controller 630 receives captured sound signals 747 from microphones 624. System controller 630 processes sound signals 747 according to app audio input mixing attributes 762 to generate mixed signals 742. In one embodiment, input mixing attributes 762 includes attribute values that indicate that no processing of the sound signals 747 is to be performed. System controller 630 copies sound signals 747 to mixed signals 742. In one embodiment, input mixing attributes 762 contain attribute values that indicate that the sound signals 747 are to be separated into speech signals and non-speech signals. System controller 630 processes sound signals 747 to separate sound signals 747 into speech signals 746 and non-speech signals 744. System controller 630 then combines speech signals 746 and non-speech signals 744 according to the input mixing attributes 762 to generate mixed signals 742. In one embodiment, input mixing attributes 762 includes one or more attributes for increasing the volume of speech signals 746, for reducing the volume of non-speech signals 744, for eliminating non-speech signals 744, for eliminating non-speech signals 744 if speech signals 746 are absent, and for eliminating non-speech signals 724 if speech signals 746 are present, or some combination thereof. In one embodiment, system controller 630 generates mixed signals 742 such that the clarity of speech signals 746 or the quality of non-speech signals 744 in sound signals 747 are increased.

In one embodiment, upon generating mixed signals 742, system controller 630 sends mixed signals 742 to phone 111. In one embodiment, phone 111 sends mixed signals 742 to audio app 114.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A phone stand, comprising:
   a phone holder for coupling to a phone, the phone for conducting an audio session, the audio session comprising at least one voice session established with a remote device and at least one other audio session of an application executing on the phone;
   a plurality of directional speakers positioned to project sound to a focused audio area corresponding to a location where a user is expected to be positioned;
   one or more other speakers; and
   a system controller configured to:
   receive audio signals of the audio session from the phone, the audio signals of the audio session comprising first audio signals received from the remote device over the at least one voice session and second audio signals received from the application executing on the phone;
   separate the first and second audio signals of the audio session into speech signals and non-speech signals;
   obtain one or more output mixing attributes for the speech signals and the non-speech signals;
   modify the speech signals and the non-speech signals based on the one or more output mixing attributes;
   generate mixed signals by combining the modified speech signals and the modified non-speech signals; and
   send the mixed signals to the plurality of directional speakers.

2. The phone stand of claim 1, further comprising one or more microphones configured to capture a user's speech as sound signals and to send the sound signals to the system controller, wherein the system controller is further configured to:
   separate the sound signals into second speech signals and second non-speech signals;
   obtain one or more input mixing attributes for the second speech signals and the second non-speech signals;
   modify the second speech signals and the second non-speech signals based on the one or more input mixing attributes;
   generate second mixed signals by combining the modified second speech signals and the modified second non-speech signals; and
   send the second mixed signals to the phone.

3. The phone stand of claim 1, wherein the output mixing attributes comprise one or more of the following:
   an attribute for increasing a volume of the speech signals;
   an attribute for reducing a volume of the non-speech signals;
   an attribute for eliminating the non-speech signals;
   an attribute for maintaining the volume of the non-speech signals;
   an attribute for eliminating the non-speech signals if the speech signals are present; and
   an attribute for increasing a clarify of the speech signals.

4. The phone stand of claim 1, wherein the system controller is further configured to receive an incoming session indication from the phone notifying the system controller of the at least one voice session and to announce the incoming session indication using the plurality of directional speakers,
   wherein the phone stand further comprises one or more microphones configured to capture speech from a user in response to the announced incoming session indication and to send sound signals of the captured speech to the system controller,
   wherein the system controller is further configured to determine that the sound signals comprise an acceptance or a decline of the at least one voice session and to send the acceptance or the decline in an incoming session response message to the phone.

5. The phone stand of claim 1, wherein the one or more other speakers comprise non-directional speakers, wherein the system controller is further configured to:
   send the modified speech signals in the mixed signals to the plurality of directional speakers; and
   send the modified non-speech signals in the mixed signals to the one or more other speakers.

6. The phone stand of claim 1, wherein the focused area comprises any one of the following:

an area away from a dashboard of a vehicle;
an area away from a passenger side compartment box of the vehicle; and an area behind a head rest of a seat in a vehicle.

7. The phone stand of claim 1, wherein the at least one voice session comprises a voice call between the phone and the remote device.

8. The phone stand of claim 1, wherein the audio signals received by the system controller comprises a first indication labeling a first portion of the audio signals as the speech signals and a second indication labeling a second portion of the audio signals as the non-speech signals.

9. A method for processing audio signals of an audio session from a phone, comprising:
   (a) receiving, by a system controller of a phone stand, the audio signals of the audio session conducted by the phone, the audio session comprising at least one voice session established with a remote device and at least one other audio session of an application executing on the phone, the phone stand comprising a phone holder for coupling to the phone, a plurality of directional speakers positioned to project sound to a focused audio area corresponding to a location where a user is expected to be positioned, and one or more other speakers, comprising:
      (a1) receiving first audio signals of the audio session from the remote device over the at least one voice session; and
      (a2) receiving second audio signals of the audio session from the application executing on the phone;
   (b) separating, by the system controller, the first and second audio signals into speech signals and non-speech signals;
   (c) obtaining, by the system controller, one or more output mixing attributes for the speech signals and the non-speech signals;
   (d) modifying the speech signals and the non-speech signals based on the one or more output mixing attributes;
   (e) generating, by the system controller, mixed signals by combining the modified speech signals and the modified non-speech signals; and
   (f) sending, by the system controller, the mixed signals to the plurality of directional speakers.

10. The method of claim 9, wherein the phone stand further comprises one or more microphones, wherein the method further comprises: capturing, by the one or more microphones, a user's speech as sound signals;
   sending, by the one or more microphones, the sound signals to the system controller;
   separating, by the system controller, the sound signals into second speech signals and second non-speech signals;
   obtaining, by the system controller, one or more input mixing attributes for the second speech signals and the second non-speech signals;
   modifying the second speech signals and the second non-speech signals based on the one or more input mixing attributes;
   generating, by the system controller, second mixed signals by combining the modified second speech signals and the modified second non-speech signals; and
   sending, by the system controller, the second mixed signals to the phone.

11. The method of claim 9, wherein the output mixing attributes comprise one or more of the following:
   an attribute for increasing a volume of the speech signals;
   an attribute for reducing a volume of the non-speech signals; an attribute for eliminating the non-speech signals;
   an attribute for maintaining the volume of the non-speech signals;
   an attribute for eliminating the non-speech signals if the speech signals are present; and
   an attribute for increasing a clarify of the speech signals.

12. The method of claim 9, wherein the phone stand further comprises one or more microphones, wherein the method further comprises:
   receiving, by the system controller, an incoming session indication from the phone notifying the system controller of the at least one voice session;
   announcing, by the system controller, the incoming session indication using the plurality of directional speakers;
   capturing, by the one or more microphones, speech from a user in response to the announced incoming session indication;
   sending, by the one or more microphones, sound signals of the captured speech to the system controller;
   determining, by the system controller, that the sound signals comprise an acceptance or a decline of the at least one voice session; and
   sending, by the system controller, the acceptance or the decline in an incoming session response message to the phone.

13. The method of claim 9, wherein the one or more other speakers comprise non-directional speakers, wherein the sending (f) comprises:
   (f1) sending, by the system controller, the modified speech signals in the mixed signals to the plurality of directional speakers; and
   (f2) sending, by the system controller, the modified non-speech signals in the mixed signals to the one or more other speakers.

14. The method of claim 9, wherein the focused area comprises any one of the following:
   an area away from a dashboard of a vehicle;
   an area away from a passenger side compartment box of the vehicle; and an area behind a head rest of a seat in a vehicle.

15. The method of claim 9, wherein the at least one voice session comprises a voice call between the phone and the remote device.

16. The method of claim 9, wherein the audio signals received by the system controller comprises a first indication labeling a first portion of the audio signals as the speech signals and a second indication labeling a second portion of the audio signals as the non-speech signals.

17. A non-transitory computer readable medium embodied in a phone stand, the medium comprising computer readable program code embodied therein, wherein when executed by a processor causes the processor to:
   (a) receive audio signals of an audio session conducted by a phone, the audio session comprising at least one voice session established with a remote device and at least one other audio session of an application executing on the phone, the phone coupled to the phone stand via a phone holder, comprising:
      (a1) receive first audio signals of the audio session from the remote device over the at least one voice session; and
      (a2) receive second audio signals of the audio session from the application executing on the phone:

(b) separate the audio signals into speech signals and non-speech signals;

(c) obtain one or more output mixing attributes for the speech signals and the non-speech signals;

(d) modify the speech signals and the non-speech signals based on the one or more output mixing attributes;

(e) generate mixed signals by combining the modified speech signals and the modified non-speech signals; and (f) send the mixed signals to a plurality of directional speakers of the phone stand, wherein the plurality of direction speakers is positioned to project sound to a focused audio area corresponding to a location where a user is expected to be positioned.

18. The medium of claim 17, wherein the phone stand further comprises one or more microphones, wherein the processor is further caused to:

receive sound signals captured by the one or more microphones from a user's speech;

separate the sound signals into second speech signals and second non-speech signals;

obtain one or more input mixing attributes for the second speech signals and the second non-speech signals;

modify the second speech signals and the second non-speech signals based on the one or more input mixing attributes;

generate second mixed signals by combining the modified second speech signals and the modified second non-speech signals; and send the second mixed signals to the phone.

19. The medium of claim 17, wherein the output mixing attributes comprise one or more of the following:

an attribute for increasing a volume of the speech signals;

an attribute for reducing a volume of the non-speech signals;

an attribute for eliminating the non-speech signals; an attribute for maintaining the volume of the non-speech signals;

an attribute for eliminating the non-speech signals if the speech signals are present; and an attribute for increasing a clarify of the speech signals.

20. The medium of claim 17, wherein the phone stand further comprises one or more microphones, wherein the processor is further caused to:

receive an incoming session indication from the phone notifying of the at least one voice session;

announce the incoming session indication using the plurality of directional speakers;

receive sound signals captured by the one or more microphones from a user's speech in response to the announced incoming session indication;

determine that the sound signals comprise an acceptance or a decline of the at least one voice session; and send the acceptance or the decline in an incoming session response message to the phone.

21. The medium of claim 17, wherein the one or more other speakers comprise non-directional speakers, wherein the send (f) comprises:

(f1) send the modified speech signals in the mixed signals to the plurality of directional speakers; and (f2) send the modified non-speech signals in the mixed signals to the one or more other speakers.

22. The medium of claim 17, wherein the focused area comprises any one of the following:

an area away from a dashboard of a vehicle;

an area away from a passenger side compartment box of the vehicle; and an area behind a head rest of a seat in a vehicle.

23. The medium of claim 17, wherein the at least one voice session comprises a voice call between the phone and the remote device.

24. The medium of claim 17, wherein the audio signals comprise a first indication labeling a first portion of the audio signals as the speech signals and a second indication labeling a second portion of the audio signals as the non-speech signals.

* * * * *